United States Patent
Hayashi

(10) Patent No.: US 9,755,259 B2
(45) Date of Patent: Sep. 5, 2017

(54) POWER GENERATION BODY

(71) Applicant: TOYOTA JIDOSHA KABUSHIKI KAISHA, Toyota-shi, Aichi-ken (JP)

(72) Inventor: Tomokazu Hayashi, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/766,179

(22) PCT Filed: Oct. 23, 2014

(86) PCT No.: PCT/JP2014/005388
§ 371 (c)(1),
(2) Date: Aug. 6, 2015

(87) PCT Pub. No.: WO2015/087477
PCT Pub. Date: Jun. 18, 2015

(65) Prior Publication Data
US 2016/0285119 A1    Sep. 29, 2016

(30) Foreign Application Priority Data

Dec. 10, 2013  (JP) ................................ 2013-254849

(51) Int. Cl.
*H01M 8/1004* (2016.01)
*H01M 8/0273* (2016.01)
(Continued)

(52) U.S. Cl.
CPC ....... *H01M 8/1004* (2013.01); *H01M 8/0273* (2013.01); *H01M 8/0284* (2013.01);
(Continued)

(58) Field of Classification Search
CPC ............. H01M 8/1004; H01M 8/0273; H01M 8/0286; H01M 8/0297; H01M 8/0284; H01M 2008/1095; H01M 2250/20
See application file for complete search history.

(56) References Cited

U.S. PATENT DOCUMENTS 8,486,578 B2 * 7/2013 Ishida ................ H01M 8/0273
429/480
2007/0215461 A1   9/2007 Zuber et al.
(Continued)

FOREIGN PATENT DOCUMENTS

JP    2005-129343    5/2005

*Primary Examiner* — Barbara Gilliam
*Assistant Examiner* — Angela Martin
(74) *Attorney, Agent, or Firm* — Finnegan, Henderson, Farabow, Garrett & Dunner, LLP

(57) ABSTRACT

There is provided a power generation body used for a fuel cell. The power generation body comprising a membrane electrode and gas diffusion layer assembly comprising an electrolyte membrane, a first catalyst layer placed on one surface of the electrolyte membrane, a second catalyst layer placed on the other surface of the electrolyte membrane, a first gas diffusion layer placed outside of the first catalyst layer and a second gas diffusion layer placed outside of the second catalyst layer; a frame placed around a circumference of the membrane electrode and gas diffusion layer assembly; and an adhesive provided to bond the membrane electrode and gas diffusion layer assembly to the frame. The first gas diffusion layer is formed to have an identical size with that of the electrolyte membrane, and the second gas diffusion layer is formed smaller than the electrolyte membrane. The frame has a stepped portion corresponding to a stepped shape formed by the electrolyte membrane and the second gas diffusion layer. The stepped portion has a bonded surface, which includes a surface opposed to the first gas diffusion layer and a surface opposed to either the electrolyte (Continued)

membrane or the second catalyst layer. The bonded surface has higher hydrophilicity than an unbonded surface, which is not bonded to another member, among surfaces of the frame.

6 Claims, 2 Drawing Sheets

(51) Int. Cl.
 *H01M 8/0286* (2016.01)
 *H01M 8/0297* (2016.01)
 *H01M 8/0284* (2016.01)
 *H01M 8/1018* (2016.01)

(52) U.S. Cl.
 CPC ....... *H01M 8/0286* (2013.01); *H01M 8/0297* (2013.01); *H01M 2008/1095* (2013.01); *H01M 2250/20* (2013.01); *Y02P 70/56* (2015.11); *Y02T 90/32* (2013.01)

(56) References Cited

U.S. PATENT DOCUMENTS

| | | | |
|---|---|---|---|
| 2010/0248087 A1* | 9/2010 | Tsuji | B29C 45/1671 429/535 |
| 2011/0162784 A1* | 7/2011 | Dabel | H01M 4/881 156/182 |
| 2013/0157175 A1* | 6/2013 | Sohma | H01M 8/10 429/535 |
| 2014/0011111 A1* | 1/2014 | Mitsuta | H01M 8/0273 429/481 |

* cited by examiner

POWER GENERATION BODY

CROSS-REFERENCE TO RELATED APPLICATIONS

This application is a national phase application of International Application No. PCT/JP2014/005388, filed Oct. 23, 2014, and claims the priority of Japanese Application No. 2013-254849, filed Dec. 10, 2013, the content of both of which is incorporated herein by reference.

TECHNICAL FIELD

The present invention relates to a power generation body used for a fuel cell.

BACKGROUND ART

With regard to a fuel cell using a polymer electrolyte membrane (hereinafter simply referred to as "electrolyte membrane") as the electrolyte, an MEGA (membrane electrode and gas diffusion layer assembly) is manufactured by various methods. For example, the MEGA may be manufactured by stacking gas diffusion layers on the respective surfaces of a CCM (catalyst coated membrane) consisting of an electrolyte membrane and catalyst layers or may be manufactured by stacking GDEs (gas diffusion electrodes), each consisting of a catalyst layer and a gas diffusion layer, on the respective surfaces of an electrolyte membrane.

The MEGA of such configuration is thin and is easily bendable. A framed membrane electrode and gas diffusion layer assembly (hereinafter referred to as "MEGA frame") has accordingly been proposed, in which a frame surrounding the circumference of an MEGA is bonded to and integrated with the circumference of the MEGA with an adhesive. In the MEGA frame, there may be a large gap between the MEGA and the frame, due to the product tolerances of the MEGA and the frame or manufacture tolerance in the course of integrating the frame with the MEGA.

FIGS. 4 and 5 are diagrams illustrating the structure of a conventional MEGA frame. A conventional MEGA frame $100p$ is manufactured by bonding an MEGA 200 to a frame $300p$ with an adhesive 400. As shown by a part A in FIG. 4, when a CCM 202 is not covered with the adhesive but is exposed, an electrolyte membrane may be split by repetition of expansion and contraction of the electrolyte membrane. In a fuel cell manufactured by using the MEGA frame $100p$ having the exposed CCM 202, there may be cross leakage of a reaction gas.

Increasing the amount of the adhesive 400 to prevent the CCM 202 from being exposed may, however, cause the excess adhesive 400 to be spread beyond a gap between the MEGA and the frame as shown in FIG. 5. A broken line H shown in FIG. 5 indicates an extended line of a lower surface of the frame $300p$, and an excess adhesive is spread out as illustrated. The spread-out excess adhesive 400 may adhere to a jig to decrease the productivity or may flow into a flow path to increase the pressure loss. This is the problem commonly found in the MEGA manufactured by stacking the GDEs on the respective surfaces of the electrolyte membrane. Japanese Patent Publication (JP) 2005-129343A discloses a MEGA frame including a frame having a space formed for accumulating the adhesive.

The MEGA frame described in JP 2005-129343A employs the structure that an MEGA is placed between two frames and a space for accumulating the excess adhesive is provided to suppress the adhesive from being spread beyond a gap formed at a bonding part of the two frames. As shown in FIG. 4, however, when one frame is bonded to the MEGA with the adhesive, the adhesive may not be guided to the space for accumulating the excess adhesive, even if any, but may be spread out. Accordingly a technique is demanded to reduce the likelihood that the excess adhesive decreases the productivity or increases the pressure loss in the flow path. With regard to the conventional MEGA frame, other needs include cost reduction, resource saving, easy manufacture and improvement of performance.

SUMMARY

In order to solve at least, part of the problems described above, the invention may be implemented by the following aspects.

According to a first aspect, a power generation body used for a fuel cell is provided. The power generation body used for the fuel cell according to the first aspect may comprise a membrane electrode and gas diffusion layer assembly comprising an electrolyte membrane, a first catalyst layer placed on one surface of the electrolyte membrane, a second catalyst layer placed on the other surface of the electrolyte membrane, a first gas diffusion layer placed outside of the first catalyst layer and a second gas diffusion layer placed outside of the second catalyst layer; a frame placed around a circumference of the membrane electrode and gas diffusion layer assembly; and an adhesive provided to bond the membrane electrode and gas diffusion layer assembly to the frame. The frame may have a bonded surface that is to be bonded to the membrane electrode and gas diffusion layer assembly and has higher hydrophilicity than an unbonded surface, which is not bonded to another member, among surfaces of the frame.

In the power generation body according to the first aspect, among the surfaces of the frame, the bonded surface has higher hydrophilicity than the unbonded surface which is not bonded to another member. This causes the excess adhesive to flow along the hydrophilic bonded surface when the membrane electrode and gas diffusion layer assembly is bonded to the frame with the liquid adhesive. Accordingly, this reduces the likelihood that the excess adhesive is spread beyond a gap between the membrane electrode and gas diffusion layer assembly and the frame to adhere to the jig and thereby decrease the productivity or to flow into the flow path and thereby increase the pressure loss. The another member is not limited to the membrane electrode and gas diffusion layer assembly but may be a member that is not included in the power generation body, for example, a separator to be bonded to the frame in manufacture of the fuel cell.

In the power generation body according to the first aspect, the membrane electrode and gas diffusion layer assembly may have a stepped shape, and the bonded surface of the frame may be formed at a position corresponding to the stepped shape of the membrane electrode and gas diffusion layer assembly. In the power generation body according to the first aspect, the first gas diffusion layer may be formed to have an identical size with that of the electrolyte membrane; the second gas diffusion layer may be formed smaller than the electrolyte membrane; the stepped shape may be formed by the electrolyte membrane and the second gas diffusion layer; and the bonded surface may include a surface opposed to the first gas diffusion layer and a surface opposed to either the electrolyte membrane or the second catalyst layer. In the power generation body according to the first aspect, the frame may have as stepped portion corresponding to the stepped shape, and the bonded surface may be formed at the stepped portion. These aspects suppress the spread-out of the adhesive at the stepped portion or the stepped shape and reduce the likelihood that the excess adhesive adheres to the jig to decrease the productivity and that the excessive adhesive flows into the flow path to increase the pressure loss.

In the power generation body according to the first aspect, the adhesive may be a UV-curing liquid adhesive. This may shorten the manufacturing time of the power generation body and improve the productivity. This may also absorb variations of the respective members constituting the power generation body and facilitate manufacturing, thus enhancing the productivity.

Any of these aspects satisfies at least one of the various needs, for example, cost reduction, resource saving, easy manufacture and improvement of performance.

The invention may be implemented by various aspects, for example, a fuel cell a fuel cell system, a vehicle and a power supply method.

DESCRIPTION OF EMBODIMENTS

A. Embodiment (A1) Structure of Fuel Cell

Figure 1:
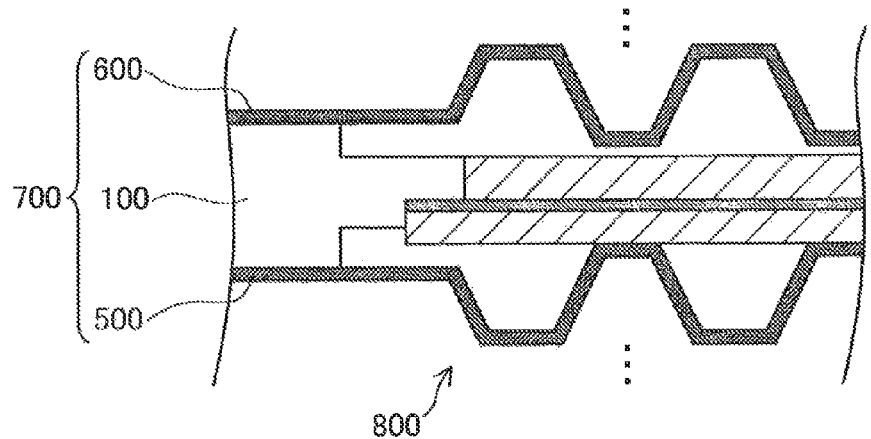
FIG. 1 is a diagram illustrating the structure of a fuel cell using an MEGA frame according to one embodiment of the invention.

FIG. 1 is a diagram illustrating the structure of a fuel cell using an MEGA frame according to one embodiment of the invention. FIG. 1 illustrates part of the cross sectional structure of a fuel cell 800. The fuel cell 800 has a stack structure of a plurality of layered bodies, each consisting of an MEGA frame 100, an anode-side separator 500 and a cathode side separator 600. Only one layered body is shown in FIG. 1 for the convenience illustration. The fuel cell 800 is a solid electrolyte fuel cell and generates electricity by using a hydrogen gas supplied as a fuel gas and the air supplied as an oxidizing gas. Water as a cooling medium is circulated in the fuel cell 800 to regulate the internal temperature of the fuel cell 800 to adequate temperature for power generation.

In the fuel cell 800, the hydrogen gas is supplied to an anode via a flow path formed in the anode-side separator 500, and the air is supplied to a cathode via a flow path formed in the cathode-side separator 600. Water is circulated in a flow path formed by the anode-side separator 500 and the cathode-side separator 600.

Figure 2:
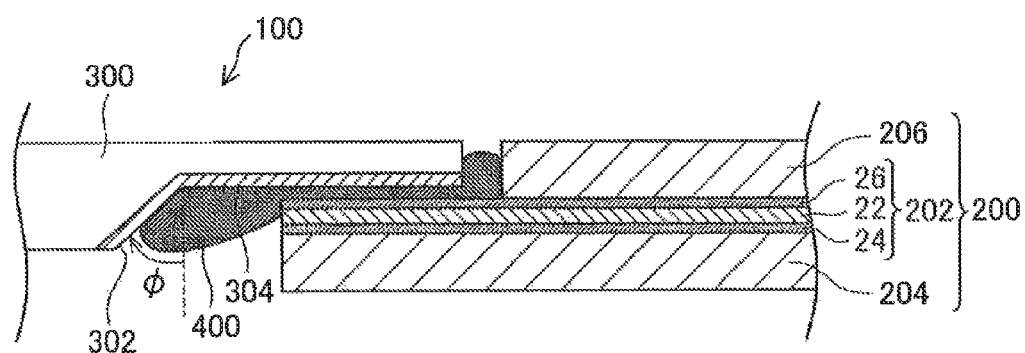
FIG. 2 is a diagram illustrating the structure of the MEGA frame according to the embodiment.

FIG. 2 is a diagram illustrating the structure of the MEGA frame according to the embodiment. FIG. 2 illustrates part of the cross sectional structure of the MEGA frame 100. The MEGA frame 100 is manufactured by bonding an MEGA 200 to a frame 300 with an adhesive 400. The MEGA frame 100 is formed in a rectangular shape in the planar view, and the frame 300 is formed in a frame profile to surround the periphery of the MEGA formed in the rectangular shape in the planar view.

As shown in FIG. 2, the MEGA 200 includes a CCM 202, an anode-side gas diffusion layer 204 and a cathode-side gas diffusion layer 206. The CCM 202 includes an electrolyte membrane 22, an anode catalyst layer 24 and a cathode catalyst layer 26. The anode-side gas diffusion layer 204 is formed in a rectangular shape of the same size (plane area) as that of the CCM 202, while the cathode-side gas diffusion layer 206 is formed in a rectangular shape of a slightly smaller size (plane area) than that of the CCM 202. Accordingly; a peripheral region of the CCM 202 is not covered by the cathode-side gas diffusion layer 206 but is exposed. In other words, in the cross sectional profile, the MEGA 200 has an end formed in a stepped shape.

The electrolyte membrane 22 is a proton-conductive ion exchange membrane made of a solid polymer material, for example, a fluororesin including perfluorocarbon sulfonate and has good electrical conductivity in the wet state. Each of the cathode catalyst layer 26 and the anode catalyst layer 24 includes catalyst-support carbon with a catalyst such as platinum or a platinum alloy supported thereon. Each of the cathode-side gas diffusion layer 206 and the anode-side gas diffusion layer 204 is made of a porous base material for diffusion layer. The base material for diffusion layer used may be, for example, a carbon porous material such as carbon paper, carbon cloth or glassy carbon or a metal porous material such as metal mesh or foamed metal.

The frame 300 has a step formed in a portion which is to be bonded to the MEGA 200 or, in other words, in an inner frame portion in the planar view, corresponding to the stepped shape formed around the circumference of the MEGA 200 (FIG. 2). The step of the frame 300 has a first surface 302 opposed to the anode-side gas diffusion layer 204 and a second surface 304 including a surface to be bonded to the CCM 202. The first surface 302 is inclined at a predetermined angle to end faces of the CCM 202 and the anode-side gas diffusion layer 204. According to this embodiment, this angle is 45 degrees on the assumption that at an angle of 0 degree, the first surface 302 is parallel to the end faces of the CCM 202 and the anode-side gas diffusion layer 204. According to this embodiment, the first surface 302 and the second surface 304 have higher hydrophilicity, compared with unbonded surfaces among the surfaces of the frame 300, which are not bonded to other members (anode-side separator 500, cathode-side separator 600 and MEGA 200).

The frame 300 is made of thermoplastic PP (polypropylene). This embodiment employs PP having high transmittance especially in a wavelength range of or above 300 nm. Other available examples of the thermoplastic resin include phenolic resin, epoxy resin, PE (polyethylene) and PET (polyethylene terephthalate). The frame 300 may alternatively be made of a thermosetting resin.

The frame 300 is manufactured by injection molding according to this embodiment but may be manufactured by melt extrusion molding. In the case of manufacture by melt extrusion molding, the sloped surface of the step is formed by, for example, compression molding after extrusion. The first surface 302 and the second surface 304 of the frame 300 are subjected to plasma treatment to have the higher hydrophilicity than that of the unbonded surfaces of the frame 300. The method employed to provide the frame 300 with hydrophilicity is not limited to the plasma treatment but may be any of other known techniques such as LTV (ultraviolet) treatment or honing process.

According to this embodiment, the adhesive 400 used may be a UV (ultraviolet)-curing liquid adhesive that produces radicals, cations, anions or the like required for curing in a wavelength range of or above 300 nm. Available examples of the resin species include epoxy resin, polyisobutylene and silicone. As described above, the frame 300 is made of PP having the high transmittance in the wavelength range of or above 300 nm. Such a liquid adhesive can thus be cured by radiation of light (ultraviolet radiation) from above the frame 300.

Figure 3:
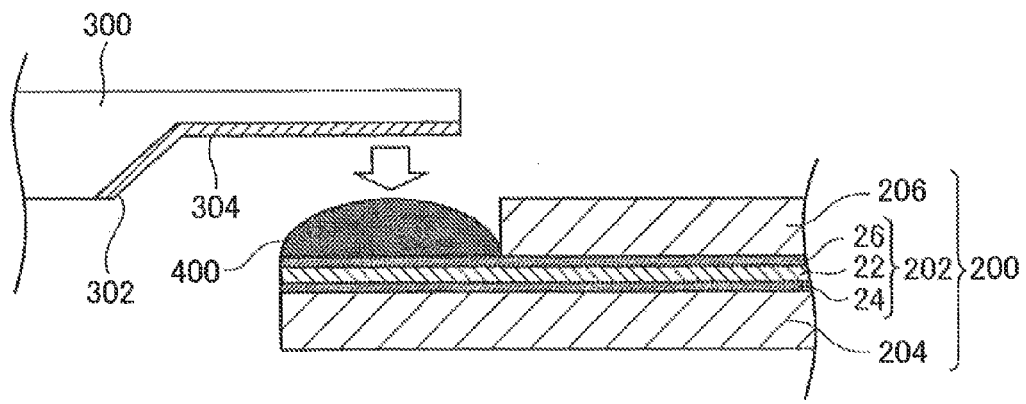
FIG. 3 is a diagram illustrating a manufacturing process of the MEGA frame according to the embodiment.

FIG. 3 is a diagram illustrating a manufacturing process of the MEGA frame 100 according to the embodiment. The manufacturing process of the MEGA frame 100 first provides the MEGA 200, the frame 300 and the liquid adhesive 400. The process subsequently applies the liquid adhesive 400 on the exposed CCM 202 of the MEGA 200 and stacks the frame 300 on the MEGA 200 as shown in FIG. 3. The first surface 302 and the second surface 304 of the frame 300 have the higher hydrophilicity than that of the unbonded surfaces of the frame 300, so that the excess adhesive is guided along the second surface 304 and the first surface 302 and flows into a gap formed between the frame 300 and the anode-side gas diffusion layer 204 as show in FIG. 2. The process then irradiates the frame 300 downward with light (ultraviolet light) required for curing the adhesive 400, so as to cure the adhesive 400. This completes manufacture of the MEGA frame 100 shown in FIG. 2.

In the MEG frame 100 according to the embodiment, the first surface 302 and the second surface 304 are provided with the higher hydrophilicity than that of the unbonded surfaces of the frame 300, so that the liquid adhesive 400 flows along the second surface 304 and the first surface 302 into the gap between the frame 300 and the anode-side gas diffusion layer 204 in the course of bonding the MEGA 200 to the frame 300. This suppresses the adhesive 400 from being spread beyond the gap and reduces the likelihood that the excess adhesive adheres to the jig to decrease the productivity and that the excessive adhesive flows into the flow path to increase the pressure loss.

This embodiment uses the UV-curing liquid adhesive and accordingly shortens the time required for curing the adhesive 400. Compared with a case using a thermosetting adhesive, this shortens the manufacturing time of the MEGA frame and increases the productivity. Using the UV-curing liquid adhesive also suppresses the MEGA frame from being deformed by heating during manufacture of the MEGA frame. Additionally, this embodiment uses the adhesive 400 that is cured in the wavelength range in which the frame 300 has high light transmittance. This reduces the quantity of light used to cure the adhesive 400 and accordingly reduces the cost. Using the liquid adhesive 400 in manufacture of the MEGA frame 100 absorbs variations in dimensions of the MEGA 200 and the frame 300, if any, and reinforces the CCM 202.

B. Modifications

The invention is not limited to the embodiment described herein but may be implemented by a diversity of other configurations without departing from the scope of the invention. For example, the technical features of the embodiment corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein. Examples of possible modification are given below.

Figure 4:
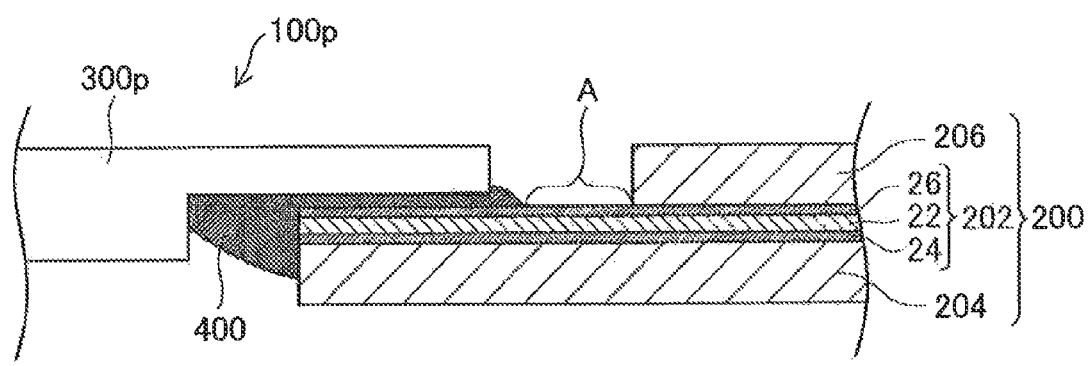
FIG. 4 is a diagram illustrating the structure of to conventional MEGA frame.
Figure 5:
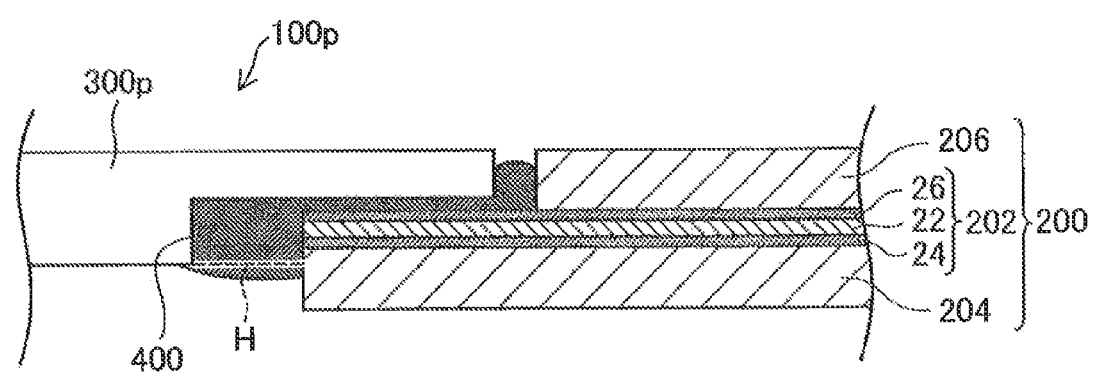
FIG. 5 is a diagram illustrating the structure of the conventional MEGA frame.

(B1) Modification 1:

In the embodiment described above, the first surface 302 of the frame 300 is inclined at 45 degrees to the end faces of the CCM 202 and the anode-side gas diffusion layer 204. The inclination is not limited to this angle but may be changed in a range of not less than 0 degree and less than 90 degrees. For example, at an angle of 0 degree, the frame has a shape as shown in FIG. 4. Even in this configuration, providing the first surface 302 opposed to the anode-side gas diffusion layer 204 and the second surface 304 including the surface that is to be bonded to the CCM 202 with higher hydrophilicity than that of unbonded surfaces of the frame 300 reduces spread-out of the excess adhesive.

(B2) Modification 2:

In the embodiment described above, the MEGA 200 has the layered structure in which the anode-side gas diffusion layer 204 and the cathode-side gas diffusion layer 206 are stacked on the respective outer surfaces of the CCM 202. The MEGA may have another layered structure in which GDEs are stacked on the respective surfaces of an electrolyte membrane or may have another layered structure in which an electrolyte membrane, a catalyst layer and a gas diffusion layer are sequentially stacked. In the layered structure in which GDEs are stacked on the respective surfaces of an electrolyte membrane, the electrolyte membrane is exposed, and a liquid adhesive is applied on the exposed electrolyte membrane to integrate the MEGA with the frame. Such modifications have similar advantageous effects to those of the above embodiment.

(B3) Modification 3:

In the embodiment described above, the cathode-side gas diffusion layer 206 is formed slightly smaller than the anode-side gas diffusion layer 204. On the contrary, the anode-side gas diffusion layer 204 may be formed slightly smaller than the cathode-side gas diffusion layer 206. This modification has similar advantageous effects to those of the above embodiment.

(B4) Modification 4:

The above embodiment describes the method of applying the adhesive 400 on the MEGA 200 to bond the MEGA 200 to the frame 300. The adhesive 400 may alternatively be applied on the frame 300. A modified method may apply the adhesive 400 on the CCM 202 and simultaneously stack and join the anode-side gas diffusion layer 204, the cathode-side gas diffusion layer 206 and the frame 300 on and with the CCM 202 to manufacture the MEGA 200. Another modified method may similarly apply the adhesive on the electrolyte membrane and simultaneously stack and join the GDEs, and the frame with the electrolyte membrane. Such modifications have similar advantageous effects to those of the above embodiment.

(B5) Modification

The above embodiment uses the UV-curing liquid adhesive as the adhesive 400. The adhesive 400 used may, however, be any of various known liquid adhesives, such as thermosetting, moisture-curing, reactive hot-melt and hot-melt adhesives. Using any of such adhesives also reduces the spread-out of the excess adhesive.

(B6) Modification 6:

In the embodiment described above, the entire frame 300 is made of the same PP, and the adhesive used 400 is cured in the wavelength range in which the frame 300 has high light transmittance. The requirement is, however, that at least a portion of the frame 300 to be bonded to the MEGA should transmit light required for curing the adhesive 400.

The present application claims priority from Japanese Patent Application (Application No. 2013-254849) under the title of "Power Generation Body" filed on Dec. 10, 2013, the entirety of disclosure of which is hereby incorporated by reference into this application.

What is claimed is:

1. A power generation body used for a fuel cell, the power generation body comprising:
   a membrane electrode and gas diffusion layer assembly comprising an electrolyte membrane, a first catalyst layer placed on one surface of the electrolyte membrane, a second catalyst layer placed on the other surface of the electrolyte membrane, a first gas diffusion layer placed outside of the first catalyst, layer and a second gas diffusion layer placed outside of the second catalyst layer;
   a frame placed around a circumference of the membrane electrode and gas diffusion layer assembly; and
   an adhesive provided to bond the membrane electrode and gas diffusion layer assembly to the frame, wherein
   the frame has a bonded surface that is bonded to the membrane electrode and gas diffusion layer assembly and has higher hydrophilicity than an unbonded surface, which is not bonded to another member, among surfaces of the frame.

2. The power generation body according to claim 1, wherein the membrane electrode and gas diffusion layer assembly has a stepped shape, and
   the bonded surface of the frame is formed at a position corresponding to the stepped shape of the membrane electrode and gas diffusion layer assembly.

3. The power generation body according to claim 2, wherein the first gas diffusion layer is formed to have an identical size with that of the electrolyte membrane,
   the second gas diffusion layer is formed smaller than the electrolyte membrane,
   the stepped shape is formed by the electrolyte membrane and the second gas diffusion layer, and
   the bonded surface includes a surface opposed to the first gas diffusion layer and a surface opposed to either the electrolyte membrane or the second catalyst layer.

4. The power generation body according to claim 1, wherein the frame has a stepped portion corresponding to the stepped shape, and
   the bonded surface is formed at the stepped portion.

5. The power generation body according to claim 1, wherein the adhesive is an UV-curing liquid adhesive.

6. The power generation body according to claim 3, wherein the bonded surface is bonded to the membrane electrode and as diffusion layer assembly via the adhesive.

* * * * *